W. O. LUM.
SYSTEM OF CONTROL.
APPLICATION FILED MAR. 30, 1914.
1,303,342. Patented May 13, 1919.
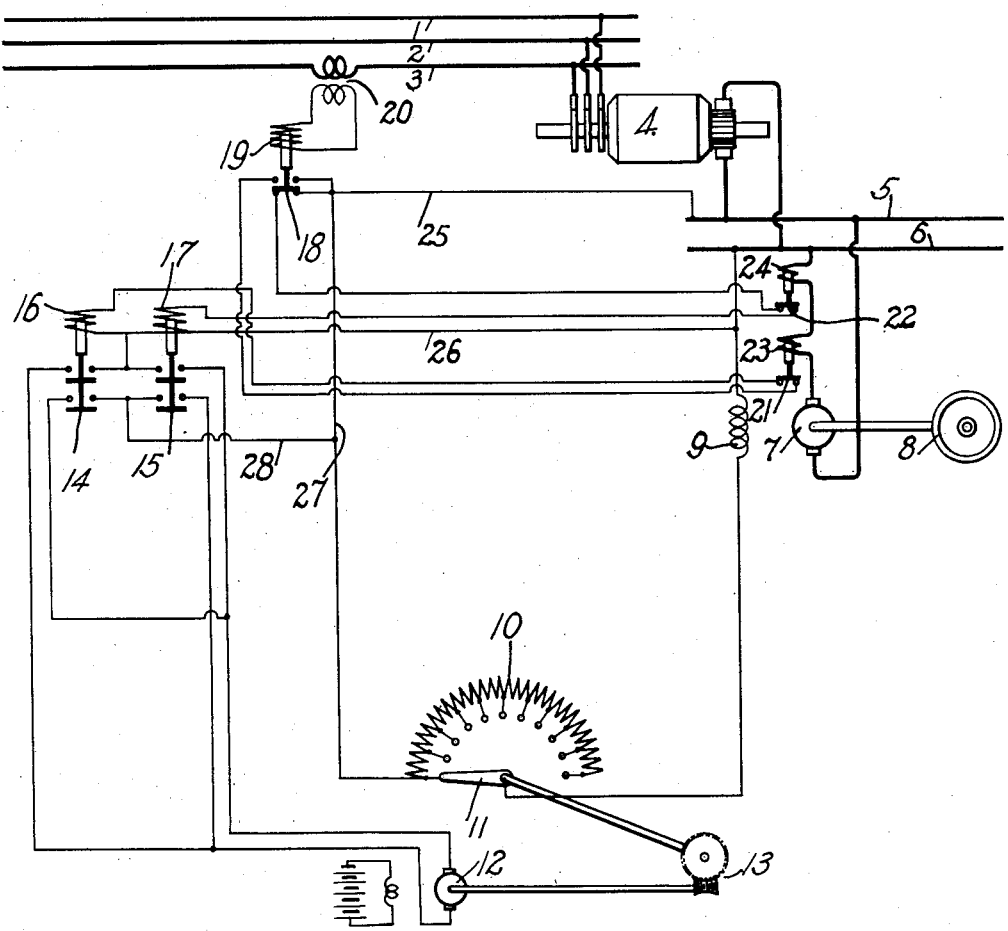
WITNESSES:
INVENTOR
Walter O. Lum
BY
ATTORNEY

UNITED STATES PATENT OFFICE.

WALTER O. LUM, OF WILKINSBURG, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,303,342.      Specification of Letters Patent.      Patented May 13, 1919.

Application filed March 30, 1914. Serial No. 828,207.

*To all whom it may concern:*

Be it known that I, WALTER O. LUM, a citizen of the United States, and a resident of Wilkinsburg, in the county of Allegheny and State of Pennsylvania, have invented a new and useful Improvement in Systems of Control, of which the following is a specification.

My invention relates to systems of control that are adapted to be employed in connection with energy-storing means for decreasing the maximum and increasing the minimum values of current that may be supplied to an electrical circuit.

My invention has for its object to provide a simple and efficient means for automatically controlling a dynamo-electric machine to store energy that is supplied by an electrical circuit and to supply energy to said circuit according to predetermined conditions.

In the operation of systems which comprise a distributing circuit that must meet the demands of widely varying loads, it is often necessary to provide a reserve source of energy that is capable of supplementing that supplied by the main source, under normal conditions. In the operations of electric railways, for example, it may happen that all of the cars or trains of the system are receiving maximum current simultaneously. The result is to cause a heavy peak load which may be of brief duration and which occurs infrequently or at irregular intervals. Periods occur, also, during which a small number of trains or cars are in operation and, accordingly, only a small amount of current is supplied to the trolley wires. It is obvious that the maximum value of current supplied under abnormal conditions is far in excess of that necessary under normal operating conditions, and that current values fluctuate between wide limits.

I provide a system in which energy is stored during periods of light load, and the energy thus stored is returned to the distributing circuit when the current supplied to the receiving devices exceeds a predetermined value. A dynamo-electric machine is automatically controlled to operate either as a motor or as a generator according as the current delivered to the distributing circuit to which it is connected falls below or exceeds a predetermined value. The demands upon the main source of current are thus equalized, or made more nearly uniform, by reducing the maximum values and by increasing the minimum values of current supplied by it.

The details of my invention will be described in connection with the accompanying drawings in which the single figure is a diagrammatic view of circuits and apparatus embodying my invention.

A transmission line, which may be connected to any suitable source of alternating current, comprises line conductors 1, 2 and 3. A rotary converter 4, which is connected to the conductors 1, 2 and 3, supplies direct current to a circuit comprising conductors 5 and 6. The direct current circuit may supply current to receiving devices that operate intermittently and at varying current values, such devices being, for example, railway cars or trains. A dynamo-electric machine 7, that is electrically connected in circuit with the conductors 5 and 6 and is mechanically connected to a fly wheel 8, is adapted to operate either as a motor or as a generator according to the excitation of its field winding 9, which is separately excited.

A resistor 10, which controls the excitation of the field winding 9, comprises a movable arm 11, the position of which is varied by a motor 12 that is connected thereto by a worm and gear mechanism 13. The motor 12 is controlled by two electromagnetic switches 14 and 15, the actuating coils 16 and 17 of which are respectively energized according to the position of a controlling relay switch 18. The actuating coil 19 of the switch 18 is in circuit with the secondary member of a current transformer 20, the primary member of which is in circuit with the line conductor 3. The switch 18 is adjusted to operate at a predetermined value of the current traversing the mains of the transmission line to close the circuit of the coil 16 and thus cause the motor 12 to rotate in one direction, and when the current falls below a predetermined value, to close the circuit of the coil 17 and thereby cause the motor 12 to operate in the reverse direction. The circuits of the coils 16 and 17 are also controlled by electromagnetic switches 21 and 22, respectively, having coils 23 and 24 that are in circuit with the dynamo-electric machine 7, and that are adapted to open the respective switches when the current traversing the coils exceeds a predetermined value.

It may be assumed that the system is in operation and that the various parts are in their respective positions, as illustrated. It may be further assumed that the current supplied by the direct current circuit to its receiving devices is such that the current traversing the alternating current mains has a value below that at which the switch 18 is adjusted to be actuated. The switch 18 is therefore in its lower position to complete a circuit extending from the positive conductor 5 through a conductor 25, switch 18, switch 22, coil 17, and conductor 26 to the negative conductor 6. The coil 17 is energized to close the switch 15 and thereby complete the circuit of the motor 12 which extends from the positive conductor 5, through conductors 25, 27 and 28, switch 15, motor 12, switch 15 and conductor 26 to the negative conductor 6. The motor 12 then actuates the resistor arm 11 in a clockwise direction to insert resistance in the circuit of the field winding 9 and thereby weaken the magnetic field of the dynamo-electric machine 7. Under normal operating conditions, the dynamo-electric machine 7 receives only sufficient current to maintain the speed of the fly wheel 8, but when its field is weakened, it receives a comparatively heavy current and is accordingly accelerated to operate, at its maximum speed, to store energy in the fly wheel 8.

When the resistance arm 11 has moved to a position such that the current traversing the circuit of the dynamo-electric machine 7 exceeds a predetermined value, the coil 24 is energized to open the switch 22 and thereby deënergize the coil 17. The switch 15 opens to break the circuit of the motor 12, and the resistor arm 11 remains stationary during such time as the switch 22 is open. In case the speed of the dynamo-electric machine 7 increases to such an extent that the current traversing its circuit is less than the predetermined value, the coil 24 is sufficiently deënergized to permit the closing of the switch 22. The motor 12 will again actuate the arm 11 to insert additional resistance in the circuit of the field winding 9 until the current traversing the coil 24 exceeds the predetermined value. The switch 22 operates, therefore, to limit the current received by the dynamo-electric machine 7 by limiting the amount of resistance inserted in series with the field winding 9.

When the load upon the direct-current circuit is such that the current supplied from the alternating-current circuit exceeds a predetermined value, the coil 19 is energized to actuate the switch 18 to its upper position and thus close a circuit comprising the coil 16 and the switch 21. The coil 16 is accordingly energized to close the switch 14, and thus complete the circuit of the motor 12, with the terminal connections reversed relatively to the circuit established by the switch 15. The motor then rotates in the reverse direction to actuate the arm 11 in a counter-clockwise direction to cut out resistance from the circuit of the field winding 9. The field of the dynamo-electric machine 7 is thereby strengthened to increase its voltage, and it operates as a generator, driven by the fly wheel 8, to deliver current to the direct-current circuit. When the current thus delivered exceeds a predetermined value, the coil 23 is energized to open the switch 21 and stop the motor 12, in the manner above described in connection with switch 22. If the speed of the fly wheel decreases to such an extent that the current generated by the dynamo-electric machine 7 falls below the predetermined value, the switch 21 again closes and the field is again strengthened until the current reaches the predetermined value. The switch 21 thus operates to limit the value of the current delivered by the dynamo-electric machine 7, to the conductors 5 and 6.

It will be noted that I provide a simple and efficient means for automatically controlling a dynamo-electric machine to operate either as a motor or as a generator to respectively store or deliver energy according to circuit conditions, and to maintain values of the current during said operations within safe limits. Oscillation or hunting of the system is prevented by the time required for the various devices to operate in sequence.

I claim as my invention:

1. In a system of control, the combination with a source of energy and an electric motor supplied thereby, of means for controlling the field excitation of said motor, said means comprising a resistor, a pilot motor, means for controlling the direction of rotation of said pilot motor in accordance with the value of the current supplied by said source and means controlled by the value of the current traversing the motor circuit for limiting the operation of the pilot motor.

2. In a system of control, the combination with a source of current and an electric motor in circuit therewith, of means for controlling the field excitation of said motor, said means comprising a resistor, a pilot motor and means for controlling the operation of said pilot motor in accordance with the values of the individual currents supplied by said source and traversing the motor circuit.

3. In a system of control, the combination with a source of current and a plurality of circuits supplied thereby, of a motor connected to one of said circuits, and means for controlling the field excitation of said motor, said means comprising a resistor, a pilot motor, means for controlling the operation of said pilot motor in accordance with the value of the current traversing the other circuit and means controlled by the value of the current traversing said motor circuit for limiting the operation of said pilot motor.

4. In a system of control, the combination with a source of current and an electrical circuit connected thereto, of a dynamo-electric machine connected to said circuit, and means for automatically controlling the field strength of said machine in accordance with the value of current supplied by said source to said circuit, said means comprising a resistor, an electric motor operatively connected thereto, reversing switches for said motor, current-limiting switches for controlling said reversing switches and a current-limiting device for rendering the one or the other of said reversing switches inoperative.

5. In a control system, the combination with a source of current, and an electrical circuit supplied thereby, of a dynamo-electric machine connected to said circuit, means comprising a resistor, an electric motor and a plurality of electromagnetically operable switches for automatically causing said machine to operate as a motor when the current supplied by said source falls below a predetermined value and to operate as a generator when the current supplied by said source exceeds the predetermined value, and means for controlling the operation of said first-named means.

6. In a system of control, the combination with a source of current, and an electrical circuit connected thereto, of a dynamo-electric machine connected to said circuit, a resistor for controlling the field excitation of said machine, means for controlling said resistor, said means comprising an electric motor, a current-limit device operatively connected to said source and a current-limit device in circuit with said machine, and means controlled by said devices for reversing said motor.

7. In a system of control, the combination with a source of current and an electrical circuit connected thereto, of a dynamo-electric machine connected to said circuit, means comprising an electric motor and an electromagnetically operable switch controlled by the current supplied by said source for controlling the voltage generated by said machine and means controlled by the current traversing the machine for limiting the action of said voltage-controlling means.

8. In a control system, the combination with a source of current and a circuit supplied from said source, of a dynamo-electric machine connected to said circuit, energy-storing means connected to said machine, means comprising an electric motor, a resistor, and a plurality of electromagnetically operable switches for causing said machine to store energy when the current supplied by said source falls below a predetermined value and for causing said machine to supply energy to said circuit when the current supplied by said source exceeds said predetermined value, and means in circuit with said motor for controlling the operation of the first-named means.

9. In a system of control, the combination with a source of current, of a dynamo-electric machine connected to said source, means controlled by the current supplied by said source for controlling the voltage generated by said machine, and means for controlling the operation of said first means.

10. In a system of control, the combination with a source of current, of a dynamo-electric machine connected to said source, means controlled by the current supplied by said source for controlling the voltage generated by said machine, and means controlled by the current in the circuit of said dynamo-electric machine for controlling the operation of said first means.

11. In a control system, the combination with a source of current, of a dynamo-electric machine having a field-magnet winding and a resistor connected to said source, means for gradually inserting said resistor into circuit under predetermined electrical conditions of said source, and means for limiting the operation of said inserting means under predetermined electrical conditions of said dynamo-electric machine.

12. In a control system, the combination with a source of current, of a dynamo-electric machine connected to said source, means for accelerating said dynamo-electric machine when the current in said source is below a predetermined value, and means for controlling the operation of said accelerating means in accordance with the value of the current in said machine.

13. In a control system, the combination with a source of current, of a dynamo-electric machine having a field-magnet winding and a resistor connected to said source, means for gradually inserting said resistor into circuit when the current in said source is below a predetermined value, means for gradually short-circuiting said resistor when said current exceeds said value, and means for limiting the operation of both said means when the current in said dynamo-electric machine exceeds a predetermined value.

In testimony whereof, I have hereunto subscribed my name this 21st day of Mar. 1914.

WALTER O. LUM.

Witnesses:
R. T. KINTZING,
B. B. HINES.